TRANSISTORIZED PEAK DETECTOR
Filed Jan. 7, 1960 2 Sheets-Sheet 1
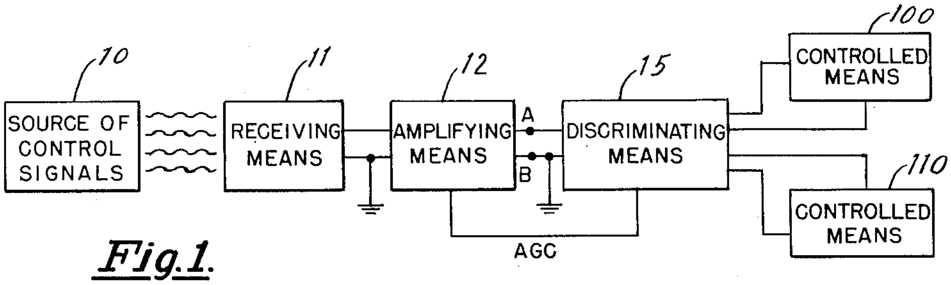
Fig.1.
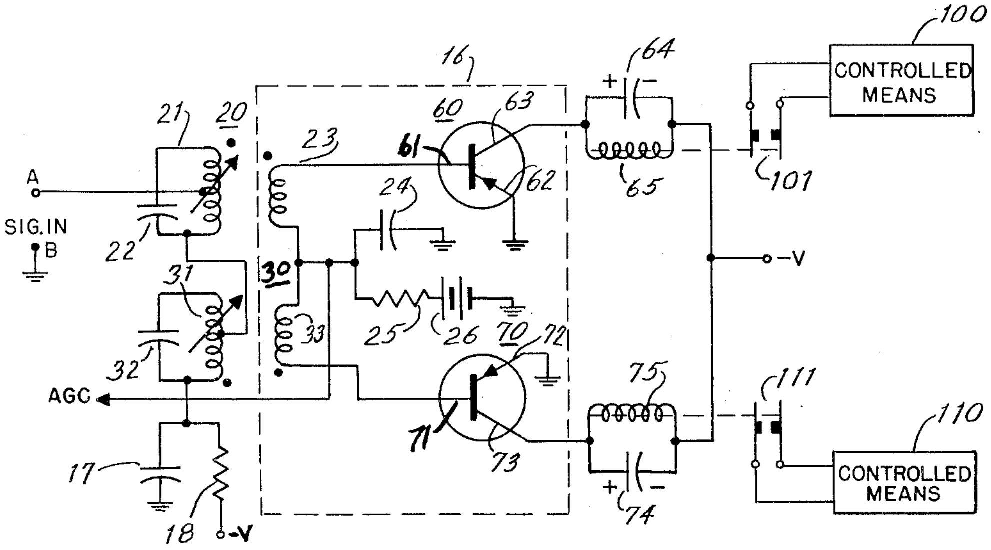
Fig.2a.
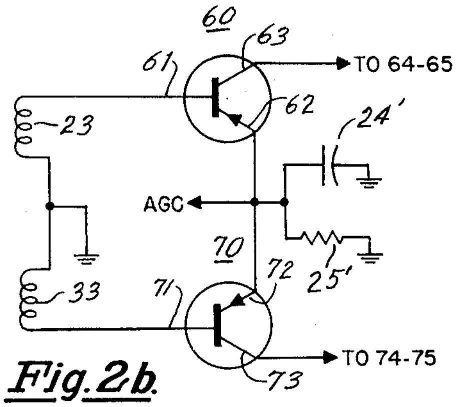
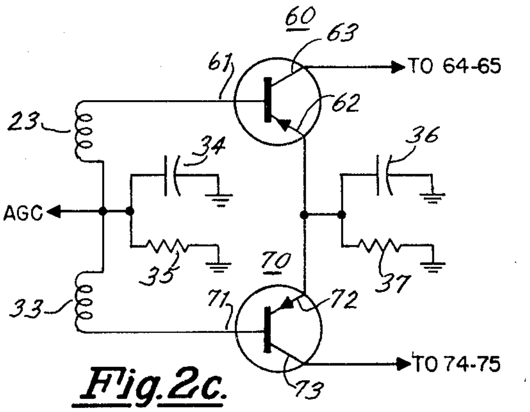
Fig.2b. Fig.2c.
INVENTOR.
Meyer Marks
BY John L. Wiegreffe
ATTY.

Aug. 15, 1961 M. MARKS 2,996,681

TRANSISTORIZED PEAK DETECTOR

Filed Jan. 7, 1960 2 Sheets-Sheet 2

INVENTOR.
Meyer Marks
BY John L. Thiegoffe
ATTY.

2,996,681

TRANSISTORIZED PEAK DETECTOR

Meyer Marks, Clarendon Hills, Ill., assignor to Admiral Corporation, Chicago, Ill., a corporation of Delaware Filed Jan. 7, 1960, Ser. No. 1,132
6 Claims. (Cl. 329—103)

Figure 3:
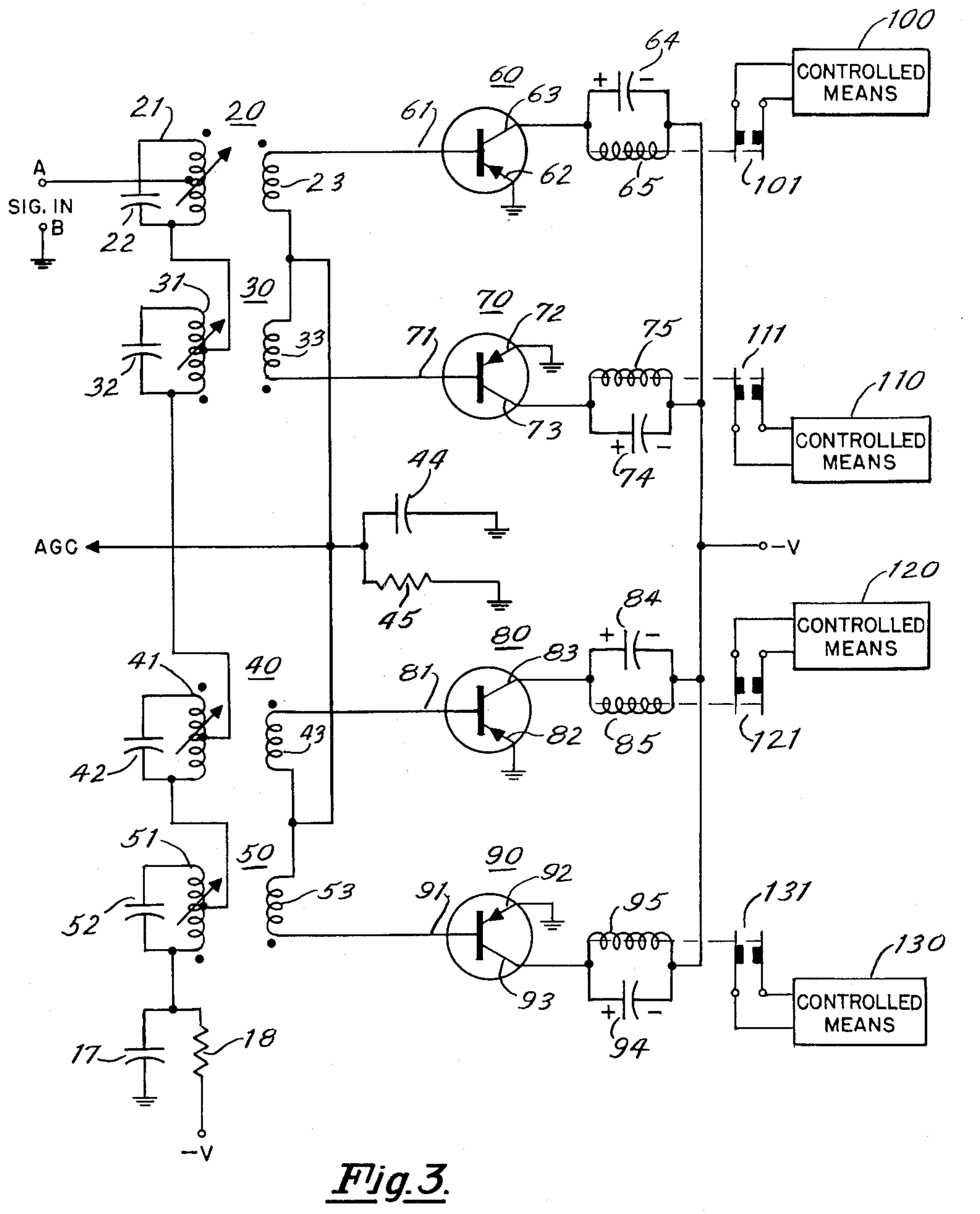

This invention relates in general to frequency selective circuits and in particular to frequency selective circuits for selectively energizing one of a plurality of utilization means in response to receipt of a corresponding one of a like plurality of control signals, each of which has a different predetermined frequency.

In this specification the term "frequency selective circuits" will be understood to be synonymous with both the term "frequency discriminator" and the term "discriminator."

Many types of frequency discriminator circuits are known in the art. In particular, one well known type employs a pair of tuned circuits connected in either a series or parallel manner across the output circuit of an amplifier. The tuned circuits are coupled to a pair of diodes which are arranged to have their output circuits connected in opposition. Thus, in the presence of a signal having the same frequency as the resonant frequency one of these tuned circuits, the associated diode conducts and a certain polarity output is obtained. In the presence of a signal having the same frequency as the resonant frequency of the other tuned circuit, the other diode conducts and an opposite polarity output is obtained. Likewise, in the presence of both signal frequencies the output will vary both in magnitude and polarity in accordance with the relative strength of the signals.

In general, this type of circuit is used for switching, that is, selecting a particular utilization device responsive to receipt of a corresponding control signal. In particular, frequency selective circuits of this type have been employed for the remote control of television receivers. In such devices a frequency selective arrangement, as mentioned above, is commonly used and the diode output voltages are individually impressed upon a biasing arrangement to effect "on" and "off" control of a relay tube. Assuming that a control signal of a particular frequency is received, the voltage developed across the diode connected to the tuned circuit corresponding to this control signal frequency is effective to change the bias on its associated relay tube and allow the relay tube to conduct. Upon conduction, the control relay, which is generally located in the output circuit of the relay tube, is energized sufficiently to effect operation of its contacts and the particular control function is then carried out.

Many such systems are in use today and, while on the whole they perform their functions satisfactorily, some improvement in reliability and in efficiency of operation is desirable. Referring particularly to those systems which employ ultrasonic control signals for actuation of the corresponding utilization devices, it has been generally necessary to employ a critically tuned discriminator circuit since the frequency separation of the various control signals is not great. In these systems malfunction often occurs for various reasons. Some of these are presence of extraneous ultrasonic noise signals at the frequencies of the discriminator circuit, Doppler effect due to movement of the transmitter during transmission of the control signal, reflections of the signal from nearby objects, misalignment of the tuned circuits and combinations of the above. Thus it would be desirable to provide means whereby upon receipt of any control signal the circuitry responsive to control signals of other frequencies is inhibited.

A recent trend, at least as far as remotely control television receivers are concerned, is to provide for complete control of the normal tuning functions of a receiver from a remote point. The major problem is that if it is desired to have an "on-off" control which is actuated remotely it is then necessary to maintain the remote amplifier unit in the receiver operative at all times. To this end, it is desirable to provide a remote control amplifier unit which draws a minimum amount of power from the power line. The discriminator circuit of the invention requires less signal power than prior art discriminators (has greater power sensitivity) and consequently, the amplifier feeding the discriminator need have less gain.

Accordingly it is an object of this invention to provide an improved discriminator circuit which requires a minimum amount of signal power.

Another object of this invention is to provide a novel discriminator circuit which utilizes single electron valves for both detecting and amplifying the control signal.

A further object of this invention is to provide an improved discriminator circuit for selectively energizing a group of control channels in response to corresponding ones of a like group of control signals in which energization of any control channel automatically inhibits energization of the remaining control channels.

While the environment chosen for description of this invention is an ultrasonic remote control system for a television receiver, it will be readily appreciated by those skilled in the art that the invention will find application in many other arrangements utilizing frequency selective circuits.

Other objects of this invention and the operation thereof will be readily apparent from a reading of the following specification taken in conjunction with the drawings in which:

FIG. 1 is a block diagram of an ultrasonic remote control system in which the invention readily finds application;

FIG. 2*a* represents a partial schematic diagram of the portion of the block diagram of FIG. 1 embodying the invention;

FIGS. 2*b* and 2*c* represent modifications of a portion of FIG. 2*a*;

FIG. 3 represents the circuitry of FIG. 2*a* modified to provide for a greater number of control functions.

It will be understood at the outset that, while transistors are shown in the drawings, conventional vacuum tubes may be substituted therefor (with obvious changes in operating potentials and polarities) on the basis that the emitter corresponds to the cathode, the base corresponds to the control grid and the collector corresponds to the plate. It will also be noted that while transistors of the PNP type are shown, transistors of the NPN type may also readily be used in this arrangement by the simple expedient of reversing the voltage polarities. Throughout this specification like reference characters are used to indicates like parts.

In FIG. 1 there is shown a source of control signals 10 which is arranged to transmit one or more control signals of different frequencies to a receiving means 11. The output of receiving means 11 is coupled to the input of amplifying means 12, the output of which is coupled to discriminating means 15. Discriminating means 15 may have a plurality of signal translation or control channels and a corresponding plurality of outputs, though only two are shown in FIG. 1. These outputs are shown individually connected to controlled means 100 and 110, respectively. As shown, the circuitry of FIG. 1 is designed to actuate controlled means 100 in the presence of a control signal of one frequency and controlled means 110 in the presence of a control signal of another frequency. In practice, controlled means 100, for example, might contain circuitry for automatically changing the station tuning of a television receiver and controlled means 110, circuitry for varying the volume level of the receiver.

Source of control signals 10 comprises, in one well known prior art television control system, an actuator or transmitter containing a number of tuned ultrasonic rods and means for individually striking them. The actuator is generally small enough to be held in the hand of the operator and the keys or buttons corresponding to the individual rods are labelled according to function such as "station selection," "volume," "on-off," etc. Of course a separate control channel is required for each control button.

In operation, the operator depresses the button corresponding to the control function desired. An ultrasonic wave of a particular frequency is then propagated through the air and is received by a suitable receiving unit in receiving means 11. The ultrasonic signal is converted into an electrical signal of like frequency and is then amplified in amplifying means 12. The amplified signal is then coupled to terminals A and B of discriminating means 15. Discriminating means 15, which will be described more fully hereinafter, contains circuitry for segregating the received control signal on the basis of its frequency, energizing the appropriate signal translation channel, and for insuring that, responsive to receipt of this frequency, the correct one of controlled means 100 and 110 is energized. As shown in FIG. 1 an AGC lead (automatic gain control) is provided from discriminating means 15 to amplifying means 12 to prevent overload of amplifying means 12, with consequent loss of selectivity, in the event a very strong signal is received. It will be understood that source of control signals 10, receiving means 11, and amplifying means 12 may take any of the various forms well known in the art. The use of AGC is, of course, optional and is not necessary in a highly selective amplifier. Although ultrasonic control signals have been discussed, any type wave energy signal may be used.

FIG. 2*a* is a schematic diagram of that portion of FIG. 1 to the right of amplifying means 12. Proceeding further with the description of the system in which ultrasonic control signals are employed, it will be noted that at terminals A and B, labelled SIG. IN, an electrical signal having the same frequency as the ultrasonic signal, appears. A pair of tuned circuits 20 and 30 comprise a portion of the discriminator. Circuit 20 is tuned to the frequency of one of the ultrasonic control signals and circuit 30 to the frequency of the other ultrasonic control signal. In practice, these ultrasonic signals are generally in the vicinity of 40,000 c.p.s. The tuned circuits are connected in series with each other and in series with a capacitor 17. The entire combination is connected across signal input terminals A and B. A source of operating potential —V is supplied to the junction of capacitor 17 and tuned circuit 30 for application through these tuned circuits to the amplifying stage (not shown) in amplifyting means 12.

Tuned circuit 20 comprises a transformer primary winding 21 and a tuning capacitor 22 connected in parallel therewith. Similarly, tuned circuit 30 comprises primary winding 31 and capacitor 32 connected in like manner. The dots near the windings are used in accordance with standard practice to indicate that the ends of the windings so marked have the same instantaneous polarity. Secondary windings 23, and 33, which are coupled to tuned circuits 20 and 30, respectively, are joined at one terminal and individually connected at the other terminal to base 61 of transistor 60 and base 71 of transistor 70, respectively. The common terminal of windings 23 and 33 is connected to ground through a resistor 25 and an optional battery supply 26. A bypass capacitor 24 is also connected between ground and the common terminal of windings 23 and 33. Emitter 62 of transistor 60 and emitter 72 of transistor 70 are grounded. The collectors (63 and 73) of transistors 60 and 70 are connected to a source of negative potential —V through relay windings 65 and 75, respectively. Each relay winding is parallelled by a capacitor, the purpose of which will be described below. Relay 65 has a pair of contacts 101 associated with it which are arranged to close when relay winding 65 is energized. Upon closure of these contacts, circuitry (not shown) in block 100 is energized to perform the control function as outlined above. Similarly, relay 75 has a pair of contacts 111 associated with it which, upon closure, operate circuitry (not shown) in block 110. The combination of winding 23 and transistor 60 should be considered as a signal translation or control channel. The combination of winding 33 and transistor 70 should be similarly considered.

The transistors employed in this and other circuits of the drawings are of the PNP type which require the base electrode to be slightly negative with respect to the emitter electrode for conduction to occur along the base-emitter path. As is well known in the art, a small base-emitter current gives rise to a large emitter-collector current and this phenomenon may be utilized for amplification. Battery 26 is incorporated to hinder conduction in the transistors until a control signal exceeding a predetermined level is received. It will be noted however that this battery is not essential to the operation of the invention. The capacitors connected in parallel with the relay windings protect the transistors from possible damage by signal transients and provide an energization delay for the relay windings. This delay requires a minimum control signal duration for relay operation and is desirable in the chosen environment of the invention since short duration noise signals in the frequency band of the control signals might otherwise actuate the relays. These capacitors also serve as an RF bypass for the relay windings.

Assume that a control signal having a frequency corresponding to the frequency of tuned circuit 20 (signal translation channel containing transistor 60) is received at signal terminals A and B. A relatively large voltage will be developed across tuned circuit 20 whereas substantially no voltage will be developed across tuned circuit 30 which, it will be recalled, is tuned to a different control signal frequency. The voltage across tuned circuit 20, which comprises alternate positive and negative half-cycles, is applied to base 61 of transistor 60. As the signal voltage swings negative, transistor 60 is driven conductive along its base-emitter path and capacitor 24 begins to charge. The direction of charge is such that the ungrounded plate of capacitor 24 swings positive. It will of course be remembered that, if battery 26 is included in the circuit, conduction in the base-emitter path of transistor 60 will be delayed until the signal voltage swings negative in an amount greater than the positive voltage presented by battery 26. In this case capacitor 24 has previously been charged to the potential of battery 26 and, upon conduction of transistor 60, develops a charge at its ungrounded plate which is more positive than the positive potential of battery 26. During the positive portion of the incoming signal, transistor 60 is rendered non-conductive along its base-emitter path and the charge developed across capacitor 24 begins to leak off through resistor 25. However, capacitor 24 does not discharge appreciably in this period. As the signal voltage swings negative again transistor 60 is rendered conductive along its base-emitter path and an even larger positive potential is developed across capacitor 24. This process is repeated for a few cycles until capacitor 24 has developed a positive charge sufficient to allow conduction in transistor 60 only during the peaks of the negative portions of the control signal.

Looking now at the collector-emitter path of transistor 60, it will be noted that when base-emitter conduction occurs conduction is initiated in the emitter-collector path. The base-emitter current follows the variations in the control signal and the emitter-collector current follows the variations in the base-emitter current. However, while the base-emitter current is very small the emitter-collector current is quite large. The emitter-collector current initially flows primarily through capacitor 64 which presents a low impedance compared to that of relay winding 65. After the signal has been present for a time interval determined by the size of capacitor 64, that is the length of time it takes to charge 64 and hence develop a substantial voltage across relay winding 65, relay winding 65 is energized sufficiently to close its associated contacts 101. Upon closure of contacts 101, circuitry (not shown) in block 100 is conditioned to perform the control function on the receiver.

As the control signal persists, a biasing voltage is developed across the parallel combination of resistor 25 and capacitor 24. This voltage is common to both base 61 of transistor 60 and base 71 of transistor 70 and hence to both translation channels. Therefore, conduction in one of these transistors responsive to a signal of one frequency tends to inhibit conduction in the other transistor since the peak amplitude of the other frequency signal must be at least as great as the signal being received in order to overcome the additional bias. It will also be seen that, whereas prior art discriminator circuits require a diode for detection of the control signal and a separate means for amplification of the detected signal to enable operation of a relay, the circuit of the invention uses the base-emitter junction of the transistor for detection and the collector-emitter junction for amplification. As mentioned previously, the transistors could be replaced by conventional vacuum tubes, with suitable changes in supply voltages. In the case of a vacuum tube, the grid-cathode path would provide the rectifying action and the plate-cathode path would provide the amplification.

Provision is also made in this circuit for automatic gain control by connecting a lead marked AGC to the common point of windings 23 and 33. It will be realized of course that this AGC takeoff point is illustrative only and other points in the circuit may be utilized to obtain automatic gain control voltage.

Similar operation obtains in the event the incoming control signal has a frequency corresponding to the frequency of tuned circuit 30 (signal translation channel containing transistor 70). In this case a substantial potential is developed across winding 33 and transistor 70 is rendered conductive along its base-emitter path. Once again capacitor 24 develops a positive charge responsive to a few cycles of the control signal and tends to bias back both transistor 70 and transistor 60. Transistor 70 conducts on the negative peaks of signal and transistor 60 is inhibited. Operation of the circuit is identical with the exception that contacts 111 close when the signal has persisted for a predetermined length of time. This time interval is dependent largely upon the size of capacitor 74.

In the event that two signals are received at input terminals A and B, and assuming that one signal corresponds to the frequency of tuned circuit 20 and the other to that of tuned circuit 30, voltage will be developed across both winding 23 and winding 33. Both transistor 60 and transistor 70 initially conduct and the charge across capacitor 24 increases much more rapidly. If the signals persist and are of nearly equal magnitude, the charge developed across capacitor 24 will be sufficient to bias transistors 60 and 70 back to a point where conduction is inhibited in both of them. While this assumed condition is rarely likely to occur it often happens that a control signal is accompanied by noise signals having components at the frequency corresponding to that of the other tuned circuit. If the control signal is strong enough it may override the noise signals but, due to the inhibition feature, more often neither signal will effect relay operation. This situation is desirable from the standpoint of noise immunity since it is much preferable to have both control channels inhibited in the presence of strong noise signals than to have faulty operation. The inhibition effect obtained is largely dependent upon the time constant of the combination of capacitor 24 and resistor 25 and may be altered by change of the time constant.

The problem of noise immunity is extremely important to prevent spurious operation of the control system. As noise pulses or signals generally comprise many frequencies it is nearly certain that in the presence thereof both tuned circuits and hence both control channels will be energized to some extent. Since both tuned circuits are energized the reverse bias developed across capacitor 24 and resistor 25 impedes transistor operation and the random noise will require a much heavier concentration at one particular frequency to cause malfunctioning of the control system. It will be readily apparent that the greater the number of tuned circuits (corresponding to a greater number of control functions and control channels) the better the noise immunity of the circuit, since the possibility of more than one tuned circuit being energized in the presence of random noise is greatly increased. A circuit of this type will be discussed more fully with reference to FIG. 3.

In FIG. 2*b* there is shown a modification of the portion of the circuitry of FIG. 2*a* which is enclosed by dashed rectangle 16. In this figure capacitor 24 and resistor 25 (in the base circuits of the transistors of FIG. 2*a*) have been replaced by a similar combination of capacitor 24' and resistor 25' connected between the emitters of transistor 60 and transistor 70 and ground. The junction of windings 23 and 33 is grounded and the AGC takeoff point moved to the junction of emitter 62 and emitter 72. When a control signal voltage appears across winding 23 transistor 60 conducts along its base-emitter path during negative portions of said signal voltage. In so doing the ungrounded side of capacitor 24' develops a negative potential. During the positive portions of the signal voltage the base-emitter path of transistor 60 is broken and capacitor 24' tends to discharge through resistor 25'. However, as before, capacitor 24' discharges only a portion of its accumulated charge and the next succeeding negative peak of signal voltage again drives transistor 60 conductive along its base-emitter path to further increase the negative charge on the ungrounded plate of capacitor 24'. This action occurs as in the case of FIG. 2*a* but, as will be seen later, due to the size of resistor 25' the bias developed by the base-emitter current is very small.

The reason is that a much larger current flows through resistor 25' and capacitor 24' as soon as transistor 60 conducts along its base-emitter path. This larger current is the emitter-collector current of transistor 60 and, as may be seen by an inspection of current directions, develops a potential such that the negative charge on the ungrounded plate of capacitor 24' is materially increased. Obviously the values of resistor 25' and capacitor 24' must be adjusted to accommodate the heavier current flow. Thus, whereas in FIG. 2*a* the base-emitter current is responsible for biasing back the transistors, in the circuit of FIG. 2*b* the emitter-collector current performs this function. In other particulars the operation of the circuit of FIG. 2*b* is the same as that of circuit of FIG. 2*a*.

FIG. 2*c* represents another modification of the circuitry enclosed within the dashed rectangles 16 of FIG. 2*a*. This circuit in effect combines the biasing technique used in FIG. 2*a* with the biasing technique used in FIG. 2*b*. In FIG. 2*c* resistor 35 and capacitor 34 develop biasing voltage responsive to the input signal whereas resistor 37 and capacitor 36 develop biasing voltage responsive to the output current flowing in the transistors. The circuit of FIG. 2*c* may be employed in lieu of the circuits of 2*a* and 2*b* where other considerations make it more expedient.

In FIG. 3 there is shown a modification of the circuitry of FIG. 2*a* in which more than two control functions are utilized. In this circuit it is assumed that four control signals of differing frequencies are employed and consequently four individual tuned circuits, corresponding to four signal translation or control channels, are required. As before it will be understood that each of these tuned circuits (20 to 50) is tuned to a particular one of the control signal frequencies. As before all of these circuits are shown connected in series relationship with respect to the signal input terminals A—B. At this point, it should be noted that, while the tuned circuit configurations of this and the preceding figures have been shown serially connected, a parallel arrangement of the tuned circuits may be readily employed. Following this reasoning it should be obvious that combinations of series and parallel circuits may also be employed. The only criterion is that all input signals be made available to all tuned circuits.

The upper portion of FIG. 3 is the same as FIG. 2*a* and contains two signal translation channels. The lower portion of FIG. 3 comprises an arrangement having two more control channels similar to those of the upper portion and includes tuned circuit 40, tuned circuit 50 and their corresponding transistors 80 and 90. Relay windings 85 and 95 are included in the output circuits of transistors 80 and 90 and control the actuation of contacts 121 and 131, respectively. These contacts in turn are connected to blocks 120 and 130 which contain circuitry (not shown) for controlling other functions of the television receiver. It will be noted particularly that all input circuits to the transistors include the parallel combination of resistor 45 and capacitor 44 which have the same function as the corresponding elements (resistor 25 and capacitor 24) in FIG. 2*a*. It should also be obvious that the biasing arrangements shown in FIGS. 2*b* and 2*c* may be employed in lieu of the arrangement shown.

In the event a signal is received at signal input terminals A and B corresponding, for example, to the frequency of tuned circuit 50, a voltage is developed across winding 53. Again, during negative portions of this signal, transistor 90 is driven conductive along its base-emitter path and, after a few cycles, a positive voltage is developed at the ungrounded plate of capacitor 44. As capacitor 44 and resistor 45 are common to all input circuits, responsive to receipt of any control frequency all of the transistors 60—90 are biased back. When the control signal has persisted for a sufficient length of time, capacitor 94 is substantially fully charged and relay winding 95 sufficiently energized to close its associated contacts 131 which act to energize the control circuitry (not shown) in block 130. Apart from the obvious use of the circuit of FIG. 3 in permitting a greater number of control functions, it has the additional advantage of providing greater noise inhibition. This is so since, as mentioned before, substantial energization of more than one tuned circuit gives rise to a reverse bias voltage which is generally sufficient to prevent any relay from operating. Since random noise comprises many different frequencies, the chances are good that more than one of the tuned circuits in the discriminator will be energized as the number of tuned circuits has been doubled. Similarly, an increase in the number of tuned circuits yields a corresponding increase in noise inhibition of the system.

What has been described is an improved frequency selective circuit which will find ready application, due to its very high power sensitiviity and reduction in parts, in all types of remote control applications. The circuit is particularly suitable where it is desired to maintain a remote control system continuously operable, that is where the remote receiving unit will be energized continuously. While the invention has been particularly described in conjunction with an ultrasonically controlled television receiver it should not be construed as being limited thereto. Since numerous modifications and departures from the invention may be made within the true scope thereof, the invention is to be limited only by the subjoined claims.

What is claimed is:

1. Circuit means selectively responsive to a pair of signals of different frequencies comprising: a first tuned circuit tuned to the frequency of one of said signals; a second tuned circuit tuned to the frequency of the other of said signals; means for applying said signals to both of said tuned circuits; a first electron valve coupled to said first tuned circuit and a second electron valve coupled to said second tuned circuit; and means common to both said tuned circuits for controlling the sensitivity of said electron valves, said means developing a bias voltage responsive to energization of said tuned circuits in accordance with but less than the combined amplitudes of the applied signals and applying said bias voltage to both said electron valves in a direction such to decrease the sensitivity of both said valves.

2. In a control system for selectively operating on a frequency basis a pair of utilization devices responsive to receipt of control signals having different predetermined frequencies, means for receiving said control signals, means for determining the frequency of said control signals comprising; a first and a second translation channel, one of said utilization devices coupled to the output of said first channel and the other of said utilization devices coupled to the output of said second channel, tuned circuit means interposed between said receiving means and said translation channels, said tuned circuit means including a first tuned circuit tuned to the frequency of one of said control signals and a second tuned circuit tuned to the frequency of the other of said control signals, each said tuned circuit energizable upon receipt of its corresponding control signal and in turn energizing its associated translation channel, and circuit means common to both said translation channels for decreasing the sensitivity thereof responsive to receipt of either or both control signals, said circuit means including a resistance-capacitance peak detector arrangement.

3. In a control system as set forth in claim 2 wherein said circuit means further includes a direct current source of potential for delaying energization of either translation channel until said control signals have an amplitude in excess of a predetermined minimum.

4. A frequency discriminator comprising in combination; a first and a second tuned circuit tuned to different frequencies; means for impressing upon both said tuned circuits a control signal having a frequency corresponding to either of said tuned circuit frequencies; a first and a second transistor each having an input circuit and an output circuit; a first utilization device connected in the output circuit of said first transistor and a second utilization device connected in the output circuit of said second transistor; means coupling said first tuned circuit to the input circuit of said first transistor and said second tuned circuit to the input circuit of said second transistor; circuit means common to both of said input circuits, said circuit means responsive to conduction in either of said transistors developing a bias voltage in accordance with but less than the voltage peaks of said control signal, said bias voltage having a polarity such that both said transistors are driven toward cutoff, whereby conduction in the other of said transistors is inhibited.

5. A frequency discriminator comprising in combination; a plurality of tuned circuits each tuned to a different frequency; means for applying signals to said tuned circuits, at least one of said signals corresponding in frequency to that of one of said plurality of tuned circuits; a plurality of translation channels individually coupled to corresponding ones of said plurality of tuned circuits; a normally nonconductive electron valve included in each said translation channel; said electron valve being driven conductive only in response to a signal having a frequency corresponding to that of the tuned circuit coupled to its translation channel; circuit means common to all said valves and effective upon conduction therein for developing a bias potential which varies as a function of the conduction currents in said valves; and means for applying said bias potential to all said valves in a direction tending to drive said transistors into cutoff.

6. In combination in a control system including a pair of translation channels adapted for energization by a pair of control signals each having a different frequency; a pair of utilization devices each connected to a respective one of said translation channels and controllable thereover; an input circuit including a first and a second tuned circuit each tuned to a respective one of said control signal frequencies, said first tuned circuit coupled to one of said channels and said second tuned circuit coupled to the other of said channels; said input circuits further including circuit means common to both said channels for developing a bias potential having a magnitude varying in accordance with, but being less than, the peak amplitude of a received control signal, in the event only one of said control signals is received, and having a magnitude similarly related to the combined peak amplitudes of said control signals, in the event both said control signals are received, said bias potential being applied to both said control channels in a direction such to decrease the sensitivity of both said control channels.

References Cited in the file of this patent

UNITED STATES PATENTS

| | | |
|---|---|---|
| 1,794,932 | Usselman | Mar. 3, 1931 |
| 2,498,253 | Curtis et al. | Feb. 21, 1950 |
| 2,857,517 | Jorgensen et al. | Oct. 21, 1958 |